US012711891B2

(12) United States Patent
Yao et al.

(10) Patent No.: US 12,711,891 B2
(45) Date of Patent: Aug. 18, 2026

(54) VOLTAGE COMPENSATION CIRCUIT, SOURCE DRIVER CIRCUIT, DISPLAY, AND VOLTAGE COMPENSATION METHOD

(71) Applicant: HUAWEI TECHNOLOGIES CO., LTD., Shenzhen (CN)

(72) Inventors: Qinren Yao, Shanghai (CN); Wei Hsiang Hung, Shenzhen (CN); Chuan Che Lee, Shenzhen (CN); Bei Li, Shenzhen (CN); Shengchao Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 19/196,529

(22) Filed: May 1, 2025

(65) Prior Publication Data

US 2025/0259584 A1 Aug. 14, 2025

Related U.S. Application Data

(63) Continuation of application No. PCT/CN2023/108887, filed on Jul. 24, 2023.

(30) Foreign Application Priority Data

Nov. 3, 2022 (CN) ......................... 202211368112.3

(51) Int. Cl.
*G09G 3/20* (2006.01)
*G09G 3/3258* (2016.01)

(52) U.S. Cl.
CPC ......... *G09G 3/2007* (2013.01); *G09G 3/3258* (2013.01); *G09G 2310/06* (2013.01);
(Continued)

(58) Field of Classification Search
CPC ............... G09G 3/2007; G09G 3/3258; G09G 2310/06; G09G 2320/0233;
(Continued)

(56) References Cited

U.S. PATENT DOCUMENTS 9,640,113 B2 5/2017 Wang
2013/0271507 A1* 10/2013 Kim ..................... G09G 3/3291 345/77

(Continued)

FOREIGN PATENT DOCUMENTS

CN 105788514 A 7/2016
CN 106157879 A 11/2016
CN 112349243 A 2/2021

*Primary Examiner* — Temesghen Ghebretinsae
*Assistant Examiner* — Ivelisse Martinez Quiles
(74) *Attorney, Agent, or Firm* — Leydig, Voit & Mayer, Ltd.

(57) ABSTRACT

Provided are a voltage compensation circuit, a source driver circuit, a display, and a voltage compensation method. The voltage compensation circuit acquires a first power supply voltage on a power line at an end of an OLED display screen in a black frame insertion phase after the OLED display screen is turned on, and obtains a reference voltage based on the first power supply voltage; then acquires a second power supply voltage on the power line when each frame of picture is displayed, and adjusts a pre-stored initial maximum Gamma voltage and a pre-stored initial minimum Gamma voltage based on a difference between the reference voltage and the currently obtained second power supply voltage, to obtain a target maximum Gamma voltage and a target minimum Gamma voltage.

15 Claims, 8 Drawing Sheets

(52) U.S. Cl.
CPC ............... *G09G 2320/0233* (2013.01); *G09G 2320/0626* (2013.01); *G09G 2320/0673* (2013.01)

(58) Field of Classification Search
CPC ... G09G 2320/0626; G09G 2320/0673; G09G 2320/0223; G09G 3/3225; G09G 3/3233; G09G 2320/029; G09G 2330/00; G09G 3/3208; G09G 2320/0276
See application file for complete search history.

(56) References Cited

U.S. PATENT DOCUMENTS

| | | | | |
|---|---|---|---|---|
| 2015/0364093 | A1 | 12/2015 | Kim et al. | |
| 2016/0049113 | A1* | 2/2016 | Park | G09G 3/3208 345/212 |
| 2020/0211457 | A1* | 7/2020 | Kim | G09G 3/3233 |
| 2022/0208085 | A1 | 6/2022 | Kim et al. | |

* cited by examiner

VOLTAGE COMPENSATION CIRCUIT, SOURCE DRIVER CIRCUIT, DISPLAY, AND VOLTAGE COMPENSATION METHOD

CROSS-REFERENCE TO RELATED APPLICATIONS

This application is a continuation of International Application No. PCT/CN2023/108887, filed on Jul. 24, 2023, which claims priority to Chinese Patent Application No. 202211368112.3, filed on Nov. 3, 2022. The disclosures of the aforementioned applications are hereby incorporated by reference in their entireties.

TECHNICAL FIELD

This application relates to the field of display technologies, and in particular, to a voltage compensation circuit, a source driver circuit, a display, and a voltage compensation method.

BACKGROUND

An organic light-emitting diode (OLED) display is one of the hot topics in the current research field of flat-panel displays. Compared with a liquid crystal display (LCD), the OLED display has advantages of low energy consumption, low production costs, self-luminescence, wide angles of view, fast response, and the like. Currently, OLED displays have begun to replace conventional LCDs in the field of flat-panel displays such as mobile phones, PDAs, and digital cameras.

In the OLED display, an OLED is driven by a pixel circuit to emit light, FIG. 1 is a diagram of a simplified circuit of a pixel circuit driving an OLED to emit light. During display, brightness of a pixel in an OLED display is determined by a current I flowing through an OLED, and a magnitude of the current I depends primarily on a magnitude of a gate-source voltage VGS of a driver transistor TFT. Smaller VGS indicates a larger current I flowing through the driver transistor TFT, and a brighter pixel. VGS=Vdata−VDD, where Vdata represents a voltage value on a data line Data, and VDD represents a voltage value on a power line ELVDD.

FIG. 2 is a diagram of a structure of an OLED display. The OLED display includes an OLED display screen 01 and a control circuit 02. The OLED display screen 01 is provided with pixels arranged in a matrix, a plurality of data lines Data, and a plurality of power lines ELVDD, and each pixel includes an OLED and a pixel circuit. The control circuit 02 primarily includes a source driver circuit (Source Driver IC) 021, a power management integrated circuit (PMIC) 022, a clock controller 023, a processor 024, an ELPMIC 025, and the like. The source driver circuit 021 is configured to provide a voltage to the data lines Data. The PMIC 022 is configured to provide a voltage to the source driver circuit 021. The ELPMIC 025 is configured to provide a voltage to the power lines ELVDD. However, because the ELPMIC 025 is far away from the OLED display screen 01, the power lines ELVDD between the ELPMIC 025 and the OLED display screen 01 are long. In this case, a voltage drop (IR Drop) on the power lines ELVDD causes VDD on the OLED display screen 01 to be lower than a voltage outputted by the ELPMIC 025, resulting in low brightness of the entire screen.

SUMMARY

This application provides a voltage compensation circuit, a source driver circuit, a display, and a voltage compensation method, which can compensate an IR Drop on a power line, to improve screen brightness.

According to a first aspect, an embodiment of this application provides a voltage compensation circuit. The voltage compensation circuit may be used in a display. The display includes an OLED display screen and a Gamma circuit. The OLED display screen is provided with pixels arranged in a matrix, a plurality of data lines, and a plurality of power lines, and each pixel includes an OLED and a pixel circuit. The Gamma circuit is integrated into a source driver circuit, and the source driver circuit is configured to provide a voltage to the data lines. The voltage compensation circuit is connected to a power line at an end of the OLED display screen and to the Gamma circuit. The voltage compensation circuit is configured to: acquire a first power supply voltage on a power line at an end of the OLED display screen in a black frame insertion phase after the OLED display screen is turned on, and obtain a reference voltage based on the first power supply voltage; then acquire a second power supply voltage on the power line when each frame of picture is displayed, and adjust a pre-stored initial maximum Gamma voltage and a pre-stored initial minimum Gamma voltage based on a difference between the reference voltage and the currently obtained second power supply voltage, to obtain a target maximum Gamma voltage and a target minimum Gamma voltage; and finally provide the obtained target maximum Gamma voltage and the obtained target minimum Gamma voltage to the Gamma circuit, for the Gamma circuit to perform Gamma curve adjustment based on the target maximum Gamma voltage and the target minimum Gamma voltage. In this case, Vdata is adjusted in real time, and an IR Drop on the power line is further compensated by adjusting Vdata, improving screen brightness.

During specific implementation, a driver circuit is usually further provided in the source driver circuit. The Gamma circuit performs Gamma curve adjustment based on the target maximum Gamma voltage and the target minimum Gamma voltage, which can generate a gray-scale voltage corresponding to image data. Then, the driver circuit may provide the gray-scale voltage to a data line of the OLED display screen, thereby implementing picture display.

During specific implementation, the voltage compensation circuit in this application may be integrated into the source driver circuit, or certainly may be provided independently of the source driver circuit. This is not limited herein.

In a possible implementation, the voltage compensation circuit may include a sampling circuit and a processing circuit.

The sampling circuit is configured to: acquire the first power supply voltage on the power line at the end of the OLED display screen at least once in the black frame insertion phase after the OLED display screen is turned on, convert the first power supply voltage acquired each time into a first digital signal, and send the first digital signal to the processing circuit; and acquire the second power supply voltage on the power line at least once when each frame of picture is displayed, convert the second power supply voltage acquired each time into a second digital signal, and send the second digital signal to the processing circuit.

For example, the sampling circuit may be an analog-to-digital converter (ADC) circuit. Precision of the ADC circuit is configured based on compensation precision that needs to be met. For example, if the compensation precision that needs to be met is 8 bits, the precision of the ADC circuit may be configured as 8-bit precision.

The processing circuit is configured to: receive, in the black frame insertion phase, each first digital signal sent by the sampling circuit, obtain the reference voltage based on at least one received first digital signal, and store the reference voltage; receive, when each frame of picture is displayed, each second digital signal sent by the sampling circuit, and adjust the pre-stored initial maximum Gamma voltage and the pre-stored initial minimum Gamma voltage based on a difference between the currently obtained second digital signal and the stored reference voltage, to obtain the target maximum Gamma voltage and the target minimum Gamma voltage; and provide the obtained target maximum Gamma voltage and the obtained target minimum Gamma voltage to the Gamma circuit in the OLED display screen, for the Gamma circuit to perform Gamma curve adjustment based on the currently obtained target maximum Gamma voltage and the currently obtained target minimum Gamma voltage.

For example, the processing circuit may be a digital signal processor (DSP).

In this embodiment, the obtained target maximum Gamma voltage and the obtained target minimum Gamma voltage are digital signals, and are applicable to a case in which the Gamma circuit is a PGamma circuit. Two DAC circuits inside the PGamma circuit may convert the target maximum Gamma voltage and the target minimum Gamma voltage respectively into two analog signals, so that the PGamma circuit may perform Gamma curve adjustment based on the two analog signals, to generate a gray-scale voltage corresponding to image data.

Optionally, in this application, the processing circuit may obtain the reference voltage based on one first digital signal, or may obtain the reference voltage based on a plurality of first digital signals. This is not limited herein.

For example, to improve accuracy of the reference voltage, the reference voltage may be obtained based on a plurality of first digital signals.

In a possible implementation, the processing circuit may calculate the reference voltage based on an average value of a plurality of received first digital signals.

In an example, the processing circuit may first determine whether the difference between the currently obtained second digital signal and the stored reference voltage is greater than a threshold; and adjust the initial maximum Gamma voltage and the initial minimum Gamma voltage separately based on the difference if the difference between the currently obtained second digital signal and the stored reference voltage is greater than the threshold, to obtain the target maximum Gamma voltage and the target minimum Gamma voltage. For example, VGSP(1)=VGSP(0)−K*(V2−Vref), and VGMP(1)=VGMP(0)−K*(V2−Vref). VGSP(1) represents the target minimum Gamma voltage, VGMP(1) represents the target maximum Gamma voltage, VGSP(0) represents the initial minimum Gamma voltage, VGMP(0) represents the initial maximum Gamma voltage, V2 represents the second digital signal, Vref represents the reference voltage, and K represents an adjustment coefficient, and may be pre-stored or may be inputted by another circuit to the processor. This is not limited herein. For example, K=0.8–1.5.

A value of the threshold is not limited in this application. The threshold may be 0, or certainly may be greater than 0. Specifically, the threshold may be designed based on an actual product.

Further, if the difference between the currently obtained second digital signal and the stored reference voltage is less than or equal to the threshold, the target maximum Gamma voltage is equal to the initial maximum Gamma voltage, and the target minimum Gamma voltage is equal to the initial minimum Gamma voltage.

According to the voltage compensation circuit provided in embodiments of this application, an IR Drop on a power line can be indirectly compensated by compensating a minimum Gamma voltage and a maximum Gamma voltage. In addition, for implementation of embodiments of this application, only an ADC and a DSP need to be introduced based on an original source driver circuit. This has low costs, has no need to occupy an area of a display screen, and can implement fast and high-precision ELVDD compensation by using a high-precision ADC.

According to a second aspect, this application further provides a voltage compensation method. The voltage compensation method may include the following steps. First, a first power supply voltage on a power line at an end of an OLED display screen is acquired in a black frame insertion phase after the OLED display screen is turned on, and a reference voltage is obtained based on the first power supply voltage. Then, a second power supply voltage on the power line is acquired when each frame of picture is displayed, and a pre-stored initial maximum Gamma voltage and a pre-stored initial minimum Gamma voltage are adjusted based on a difference between the reference voltage and the currently obtained second power supply voltage, to obtain a target maximum Gamma voltage and a target minimum Gamma voltage. Finally, the obtained target maximum Gamma voltage and the obtained target minimum Gamma voltage are provided to a Gamma circuit, for the Gamma circuit to perform Gamma curve adjustment based on the target maximum Gamma voltage and the target minimum Gamma voltage.

In a possible design, the first power supply voltage on the power line at the end of the OLED display screen is acquired at least once in the black frame insertion phase after the OLED display screen is turned on, the first power supply voltage acquired each time is converted into a first digital signal, the reference voltage is obtained based on at least one first digital signal, and the reference voltage is stored. The second power supply voltage on the power line is acquired at least once when each frame of picture is displayed, the second power supply voltage acquired each time is converted into a second digital signal, and the pre-stored initial maximum Gamma voltage and the pre-stored initial minimum Gamma voltage are adjusted based on a difference between the currently obtained second digital signal and the stored reference voltage, to obtain the target maximum Gamma voltage and the target minimum Gamma voltage.

Optionally, the reference voltage may be calculated based on an average value of a plurality of first digital signals.

In an example, whether the difference between the currently obtained second digital signal and the stored reference voltage is greater than a threshold may be first determined; and the initial maximum Gamma voltage and the initial minimum Gamma voltage are adjusted separately based on the difference if the difference between the currently obtained second digital signal and the stored reference voltage is greater than the threshold, to obtain the target maximum Gamma voltage and the target minimum Gamma voltage.

Further, if the difference between the currently obtained second digital signal and the stored reference voltage is less than or equal to the threshold, the target maximum Gamma voltage is equal to the initial maximum Gamma voltage, and the target minimum Gamma voltage is equal to the initial minimum Gamma voltage.

According to a third aspect, this application further provides a source driver circuit, including the voltage compensation circuit provided in the first aspect or any implementation of the first aspect, and a Gamma circuit connected to the voltage compensation circuit. When each frame of picture is displayed, a pre-stored initial maximum Gamma voltage and a pre-stored initial minimum Gamma voltage may be adjusted based on a difference between a second power supply voltage on a power line and a reference voltage, to obtain a target maximum Gamma voltage and a target minimum Gamma voltage, and then the obtained target maximum Gamma voltage and the obtained target minimum Gamma voltage are provided to the Gamma circuit. The Gamma circuit may perform Gamma curve adjustment based on the target maximum Gamma voltage and the target minimum Gamma voltage, to adjust Vdata in real time, to further compensate an IR Drop on a power line by adjusting Vdata, improving screen display brightness.

For example, the source driver circuit further includes a driver circuit. The Gamma circuit performs Gamma curve adjustment based on the target maximum Gamma voltage and the target minimum Gamma voltage, which can generate a gray-scale voltage corresponding to image data. Then, the driver circuit may provide the gray-scale voltage to a data line of the OLED display screen, thereby implementing picture display.

According to a fourth aspect, this application further provides a display, including an OLED display screen and the source driver circuit provided in the third aspect, where the source driver circuit is configured to drive the OLED display screen. The display may be any product or component with a display function, such as a mobile phone, a tablet computer, a television, a notebook computer, a digital photo frame, or a navigator. For implementation of the display, refer to the foregoing embodiment of the source driver circuit. Details are not described again.

For technical effects that can be achieved according to the third aspect and the fourth aspect, refer to the descriptions of the technical effects that can be achieved according to any possible design in the foregoing first aspect. Details are not described herein again.

REFERENCE NUMERALS

01: OLED display screen; 02: Control circuit; 03: Housing; 021: Source driver circuit; 022: PMIC; 023: Clock controller; 024: Processor; 025: ELPMIC; 001: Gamma circuit; 002: Driver circuit: 003: Voltage compensation circuit; 0031: Sampling circuit; 0032: Processing circuit; TFT: Driver transistor; Data: Data line; ELVDD: Power line.

DESCRIPTION OF EMBODIMENTS

To make objectives, technical solutions, and advantages of this application clearer, the following further describes this application in detail with reference to the accompanying drawings. A specific operation method in a method embodiment may also be applied to an apparatus embodiment or a system embodiment. It should be noted that in description of this application, "at least one" means one or more, and "a plurality of" means two or more. In view of this, in embodiments of this application, "a plurality of" may also be understood as "at least two". In addition, it should be understood that in description of this application, terms such as "first" and "second" are merely used for distinguishing and description, but should not be understood as indicating or implying relative importance, or should not be understood as indicating or implying a sequence.

It should be noted that, "connection" in embodiments of this application refers to an electrical connection, and a connection between two electrical elements may be a direct or indirect connection between the two electrical elements. For example, a connection between A and B may be a direct connection between A and B, or may be an indirect connection between A and B through one or more other electrical elements. For example, that A is connected to B may also be that A is directly connected to C, and C is directly connected to B, so that A and B are connected through C.

Figure 3:
FIG. 3 is a diagram of a structure of a terminal according to an embodiment of this application.

To facilitate understanding of a compensation circuit provided in embodiments of this application, an application scenario of the compensation circuit is first described. The compensation circuit may be used in a terminal. The terminal includes, for example, a watch, a mobile phone, a tablet computer, a personal digital assistant (PDA), an on-board computer, a display (monitor), and a television (TV). A specific form of the terminal is not particularly limited in embodiments of this application. For ease of description, the following uses an example in which the terminal is a mobile phone for description. As shown in FIG. 3, the terminal primarily includes an OLED display screen 01, a control circuit, and a housing 03. The OLED display screen 01 and the control circuit may be provided in the housing 03.

Figure 1:
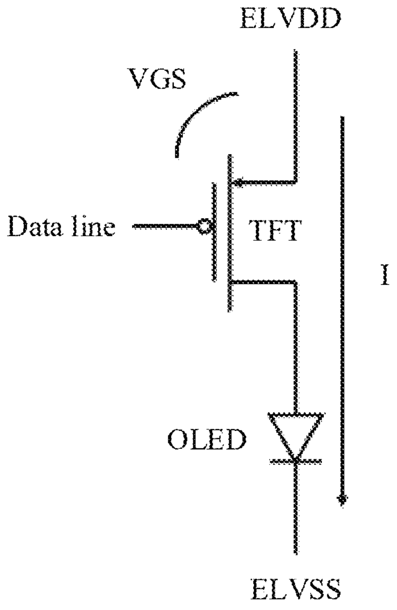
FIG. 1 is a diagram of a simplified circuit of a pixel circuit driving an OLED to emit light according to an embodiment of this application.
Figure 2:
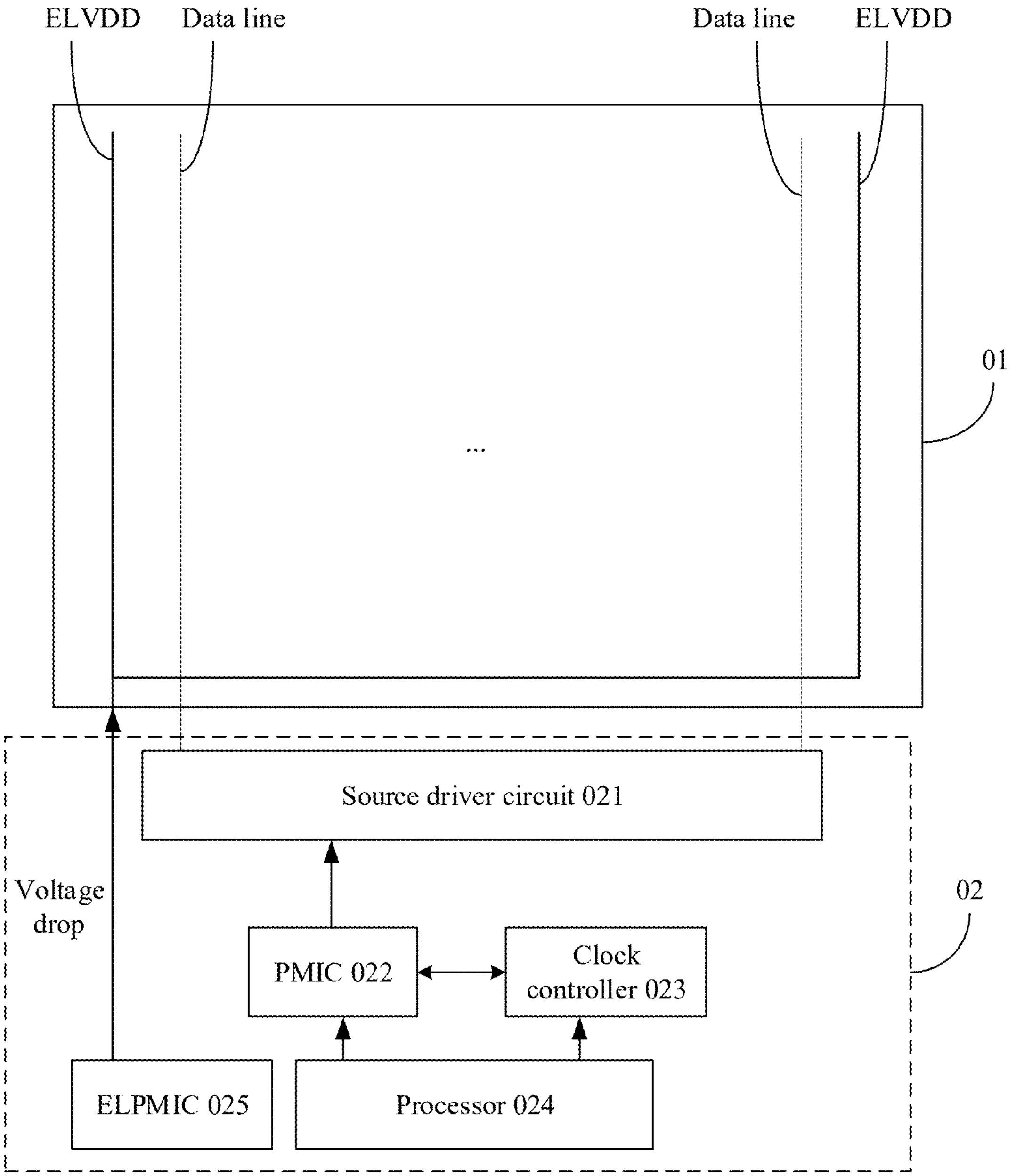
FIG. 2 is a diagram of a structure of an OLED display according to an embodiment of this application.

Refer to FIG. 2. The OLED display screen 01 is provided with pixels arranged in a matrix, a plurality of data lines Data, and a plurality of power lines ELVDD, and each pixel includes an OLED and a pixel circuit. The control circuit 02 primarily includes a source driver circuit 021, a PMIC 022, a clock controller 023, a processor 024, an ELPMIC 025, and the like. The source driver circuit 021 is configured to provide a voltage to the data lines Data. The PMIC 022 is configured to provide a voltage to the source driver circuit 021. The ELPMIC 025 is configured to provide a voltage to the power lines ELVDD. However, because the ELPMIC

025 is far away from the OLED display screen 01, the power lines ELVDD between the ELPMIC 025 and the OLED display screen 01 are long. In this case, a voltage drop on the power lines ELVDD causes VDD on the OLED display screen 01 to be lower than a voltage outputted by the ELPMIC 025, resulting in low brightness of the entire screen.

In view of this, this application provides a voltage compensation circuit, a source driver circuit, a display, and a voltage compensation method, which can compensate a voltage drop on ELVDD. For ease of understanding, a Gamma curve is first described.

The Gamma curve is an important parameter that characterizes a response of optical brightness of an OLED display screen to an electrical signal. Display brightness of the display screen can be adjusted by adjusting the Gamma curve. The Gamma curve may indicate a correspondence between a voltage value of a gray-scale value of each node and the gray-scale value, or may indicate a correspondence between a stored value in a register of the OLED display screen and a gray-scale value. In this case, in the Gamma curve, the voltage value corresponding to the gray-scale value of each node and the stored value in the register of the OLED module are in a one-to-one correspondence.

Figure 4:
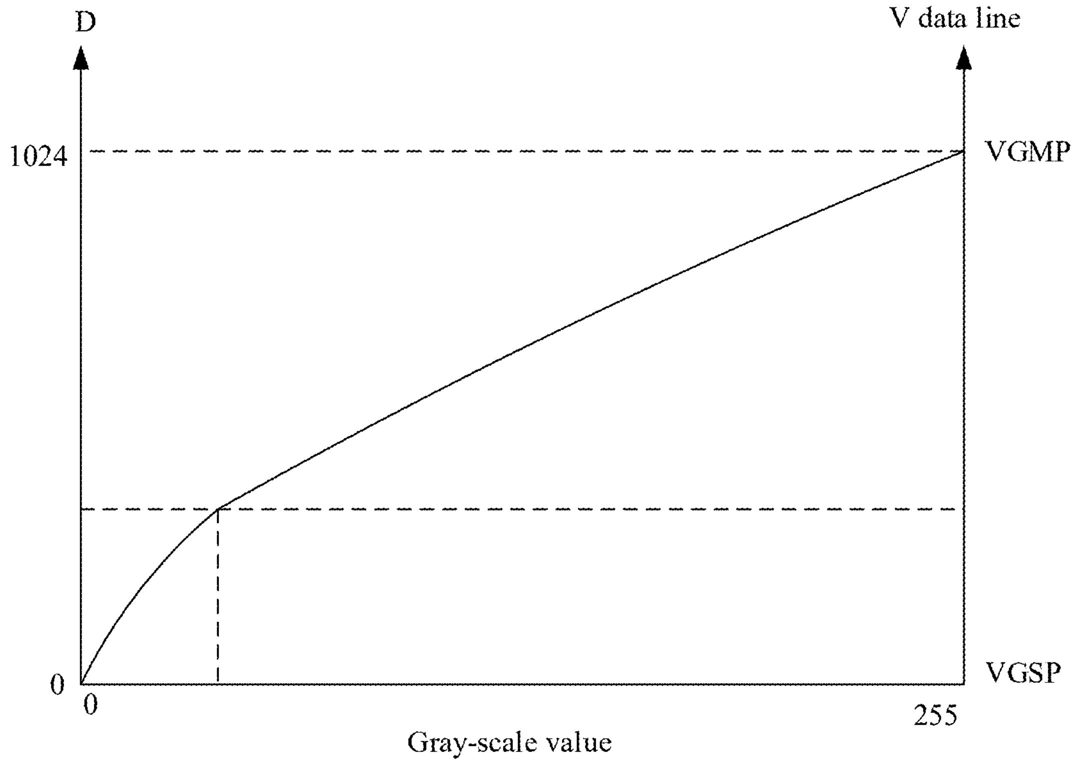
FIG. 4 is a diagram of a set of specified Gamma curves according to an example of this application.

FIG. 4 is a diagram of a relationship between parameters corresponding to a Gamma curve of an OLED display screen according to an embodiment of this application. FIG. 4 shows a set of specified Gamma curves according to an example. Horizontal coordinates in FIG. 4 represent gray-scale values Gray of nodes. Herein, for example, a number of bits of the gray-scale value Gray is set to 8 bits, in other words, there are a total of 256 gray-scale values in the Gamma curve, which are gray-scale values 0 to 255. Left vertical coordinates represent stored values D in a register. A stored value D may represent an initial value that is of a to-be-adjusted gray-scale value and that is stored in the register, that is, image data. Herein, for example, the stored value D is expressed in 10-bit binary, and a value range of the stored value D is 0 to 1024. Right vertical coordinates represent gray-scale voltage values Vdata (that is, voltage values corresponding to different gray-scale values, also voltage values on a data line Data during display). Herein, for example, a value range of the gray-scale voltage value Vdata is set to VGSP to VGMP. VGSP represents a low voltage of a Gamma circuit, and may correspond to a lowest gray-scale voltage, for example, a voltage value corresponding to a gray-scale value 0. VGMP represents a high voltage of a Gamma circuit, and may correspond to a highest gray-scale voltage, for example, a voltage value corresponding to a gray-scale value 255. Specifically, as shown in FIG. 4, each gray-scale value Gray in the Gamma curve is in a one-to-one correspondence with both a gray-scale voltage value Vdata and a stored value D in the register, in other words, a voltage value of each node in the gray-scale voltage values Vdata and a stored value of each node in the stored values D are in a one-to-one correspondence. For example, a value range of the gray-scale voltage value Vdata is VGSP to VGMP, and a value range of the stored value D is 0 to 1024. The Gamma circuit may determine, based on VGSP to VGMP, a gray-scale voltage value Vdata corresponding to a stored value D (0 to 1024) of each node in the register, to convert image data into a gray-scale voltage. This process is referred to as Gamma adjustment. To make a Source Driver IC more flexible, a digital Gamma (PGamma) circuit becomes a mainstream implementation of a Gamma circuit. VGMP and VGSP of a PGamma circuit are generated respectively by conversion of two digital signals inputted to the PGamma circuit by two digital-to-analog converter (DAC) circuits inside the PGamma circuit.

The following further describes in detail this application with reference to the accompanying drawings.

Figure 5:
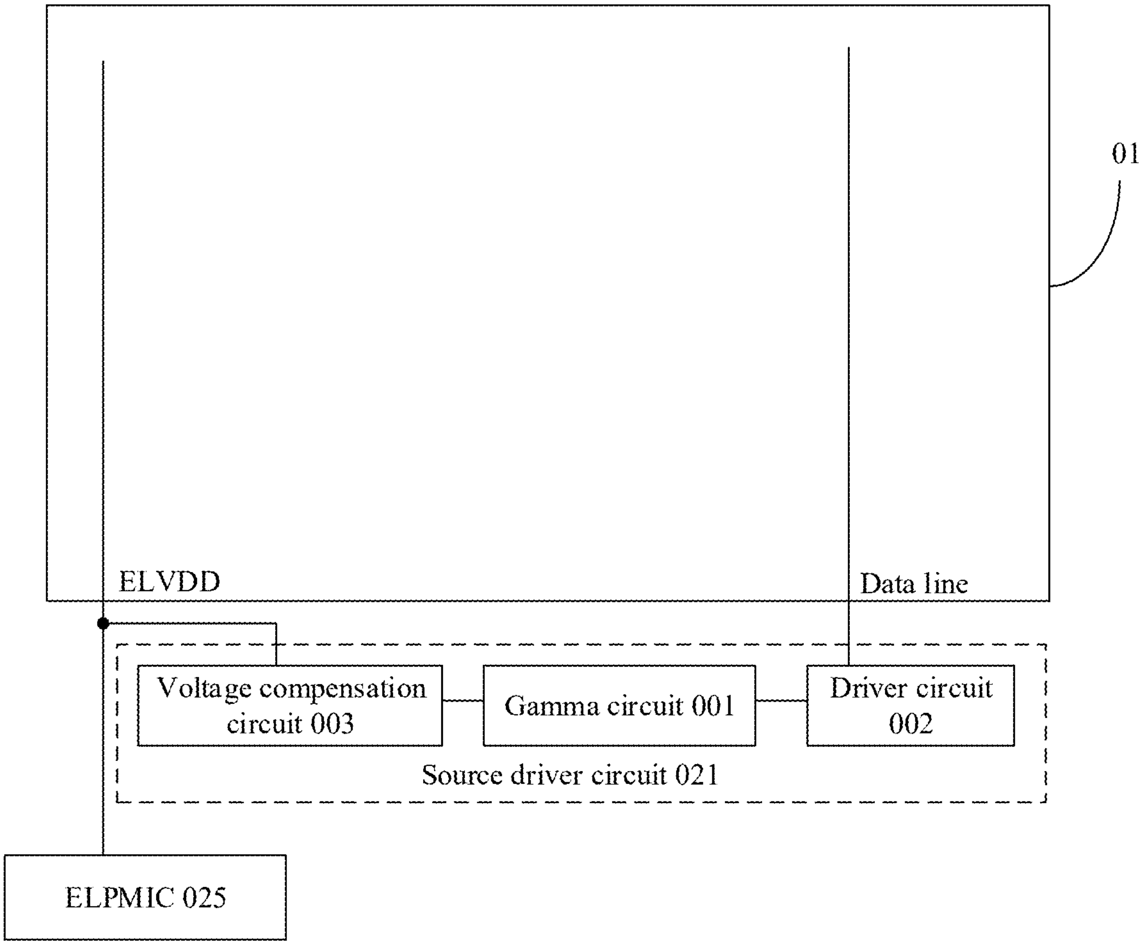
FIG. 5 is a diagram of a structure of a voltage compensation circuit used in a display according to an embodiment of this application.
Figure 6:
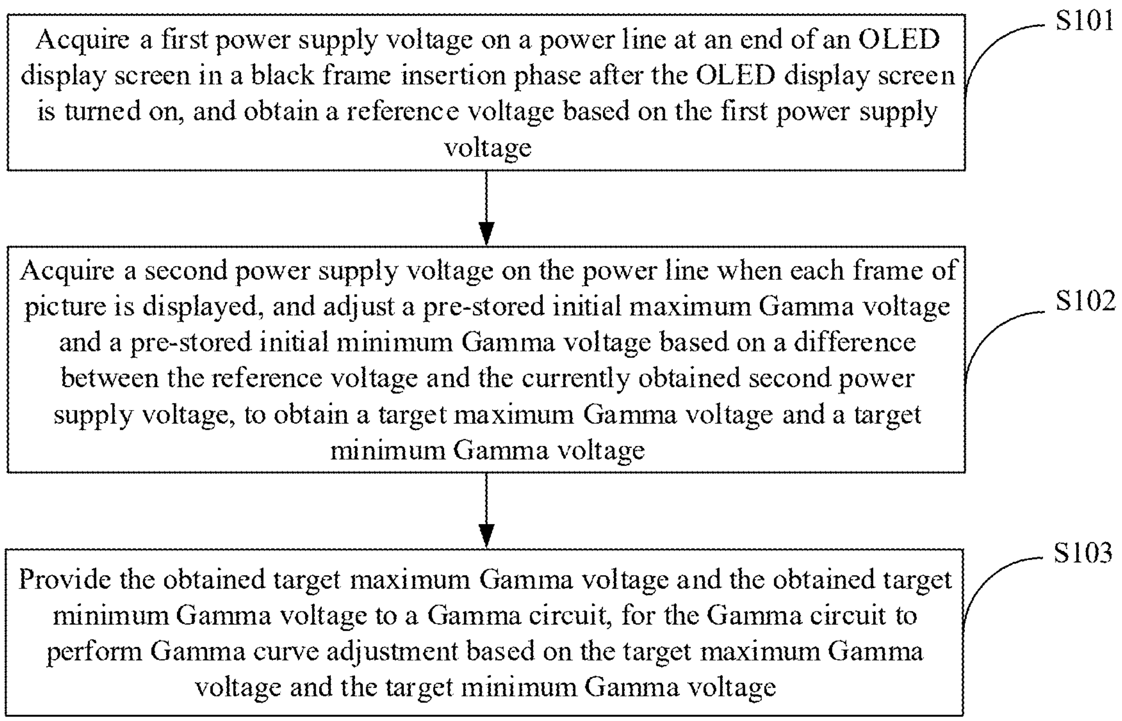
FIG. 6 is a schematic flowchart of a voltage compensation method according to an embodiment of this application.

FIG. 5 is a diagram of a structure of a voltage compensation circuit 003 according to an embodiment of this application. The voltage compensation circuit 003 is used in a display. The display includes an OLED display screen 01, a Gamma circuit 001, and an ELPMIC 025. The OLED display screen 01 is provided with pixels arranged in a matrix, a plurality of data lines Data, and a plurality of power lines ELVDD, and each pixel includes an OLED and a pixel circuit. The Gamma circuit 001 is integrated into a source driver circuit 021. The source driver circuit 021 is configured to provide a voltage to the data lines Data. The ELPMIC 025 is configured to provide a voltage to the power lines ELVDD. The voltage compensation circuit 003 is connected to a power line ELVDD at an end of the OLED display screen 01 and to the Gamma circuit 001. The voltage compensation circuit 003 may perform voltage compensation by using the following method. As shown in FIG. 6, the method may include the following steps.

Step S101: Acquire a first power supply voltage on a power line ELVDD at an end of the OLED display screen 01 in a black frame insertion phase after the OLED display screen 01 is turned on, and obtain a reference voltage based on the first power supply voltage.

In an actual display process, after the OLED display screen 01 is powered on, there is a black frame insertion phase before each frame of picture is normally displayed. In the black frame insertion phase, the OLED display screen 01 displays a black frame insertion picture. In this phase, it may be considered that almost no current is supplied to the OLED. In this case, the reference voltage is obtained based on the first power supply voltage on the power line ELVDD at the end of the OLED display screen 01.

Step S102: Acquire a second power supply voltage on the power line ELVDD when each frame of picture is displayed, and adjust a pre-stored initial maximum Gamma voltage and a pre-stored initial minimum Gamma voltage based on a difference between the reference voltage and the currently obtained second power supply voltage, to obtain a target maximum Gamma voltage and a target minimum Gamma voltage.

Step S103: Provide the obtained target maximum Gamma voltage and the obtained target minimum Gamma voltage to the Gamma circuit 001, for the Gamma circuit 001 to perform Gamma curve adjustment based on the target maximum Gamma voltage and the target minimum Gamma voltage.

During specific implementation, as shown in FIG. 5, a driver circuit 002 is usually further provided in the source driver circuit 021. The Gamma circuit 001 performs Gamma curve adjustment based on the target maximum Gamma voltage and the target minimum Gamma voltage, which can generate a gray-scale voltage corresponding to image data. Then, the driver circuit 002 may provide the gray-scale voltage to a data line of the OLED display screen 01, thereby implementing picture display.

The voltage compensation circuit 003 provided in embodiments of this application may adjust a pre-stored initial maximum Gamma voltage and a pre-stored initial minimum Gamma voltage based on a difference between a second power supply voltage on a power line ELVDD and a reference voltage when each frame of picture is displayed, to obtain a target maximum Gamma voltage and a target minimum Gamma voltage, and then provide the obtained target maximum Gamma voltage and the obtained target minimum Gamma voltage to the Gamma circuit 001, for the Gamma circuit 001 to perform Gamma curve adjustment based on the target maximum Gamma voltage and the target minimum Gamma voltage, to adjust Vdata in real time, to further compensate an IR Drop on ELVDD by adjusting Vdata, improving screen brightness.

During specific implementation, the voltage compensation circuit 003 in this application may be integrated into the source driver circuit 021, or certainly may be provided independently of the source driver circuit 021. This is not limited herein.

Figure 7:
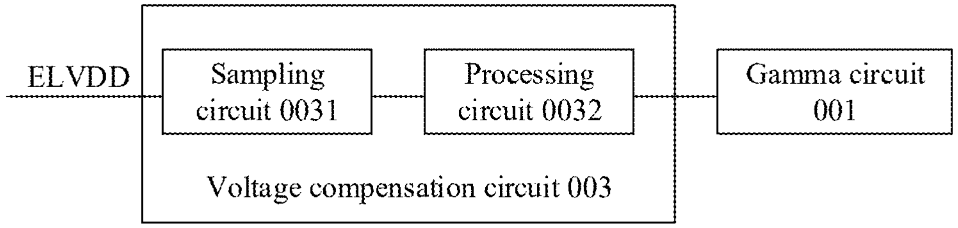
FIG. 7 is a diagram of a structure of a voltage compensation circuit according to an embodiment of this application.

In a possible implementation, as shown in FIG. 7, the voltage compensation circuit 003 may include a sampling circuit 0031 and a processing circuit 0032.

The sampling circuit 0031 is configured to: acquire the first power supply voltage on the power line ELVDD at the end of the OLED display screen 01 at least once in the black frame insertion phase after the OLED display screen 01 is turned on, convert the first power supply voltage acquired each time into a first digital signal, and send the first digital signal to the processing circuit 0032; and acquire the second power supply voltage on the power line ELVDD at least once when each frame of picture is displayed, convert the second power supply voltage acquired each time into a second digital signal, and send the second digital signal to the processing circuit 0032.

For example, the sampling circuit 0031 may be an analog-to-digital converter (ADC) circuit. Precision of the ADC circuit is configured based on compensation precision that needs to be met. For example, if the compensation precision that needs to be met is 8 bits, the precision of the ADC circuit may be configured as 8-bit precision.

The processing circuit 0032 is configured to: receive, in the black frame insertion phase, each first digital signal sent by the sampling circuit 0031, obtain the reference voltage based on at least one received first digital signal, and store the reference voltage; receive, when each frame of picture is displayed, each second digital signal sent by the sampling circuit 0031, and adjust the pre-stored initial maximum Gamma voltage and the pre-stored initial minimum Gamma voltage based on a difference between the currently obtained second digital signal and the stored reference voltage, to obtain the target maximum Gamma voltage and the target minimum Gamma voltage; and provide the obtained target maximum Gamma voltage and the obtained target minimum Gamma voltage to the Gamma circuit 001 in the OLED display screen 01, for the Gamma circuit 001 to perform Gamma curve adjustment based on the currently obtained target maximum Gamma voltage and the currently obtained target minimum Gamma voltage.

For example, the processing circuit 0032 may be a digital signal processor (DSP).

In this embodiment, the obtained target maximum Gamma voltage and the obtained target minimum Gamma voltage are digital signals, and are applicable to a case in which the Gamma circuit 001 is a PGamma circuit 001. Two DAC circuits inside the PGamma circuit 001 may convert the target maximum Gamma voltage and the target minimum Gamma voltage respectively into two analog signals, so that the PGamma circuit 001 may perform Gamma curve adjustment based on the two analog signals, to generate a gray-scale voltage corresponding to image data.

Optionally, in this application, the processing circuit 0032 may obtain the reference voltage based on one first digital signal, or may obtain the reference voltage based on a plurality of first digital signals. This is not limited herein.

For example, to improve accuracy of the reference voltage, the reference voltage may be obtained based on a plurality of first digital signals.

In a possible implementation, the processing circuit 0032 may calculate the reference voltage based on an average value of a plurality of received first digital signals.

In an example, the processing circuit 0032 may first determine whether the difference between the currently obtained second digital signal and the stored reference voltage is greater than a threshold; and adjust the initial maximum Gamma voltage and the initial minimum Gamma voltage separately based on the difference if the difference between the currently obtained second digital signal and the stored reference voltage is greater than the threshold, to obtain the target maximum Gamma voltage and the target minimum Gamma voltage. For example, VGSP(1)=VGSP(0)−K*(V2−Vref), and VGMP(1)=VMSP(0)−K*(V2−Vref). VGSP(1) represents the target minimum Gamma voltage, VGMP(1) represents the target maximum Gamma voltage, VGSP(0) represents the initial minimum Gamma voltage, VGMP(0) represents the initial maximum Gamma voltage, V2 represents the second digital signal, Vref represents the reference voltage, and K represents an adjustment coefficient, and may be pre-stored or may be inputted by another circuit to the processor. This is not limited herein. For example, K=0.8~1.5.

A value of the threshold is not limited in this application. The threshold may be 0, or certainly may be greater than 0. Specifically, the threshold may be designed based on an actual product.

Further, if the difference between the currently obtained second digital signal and the stored reference voltage is less than or equal to the threshold, the target maximum Gamma voltage is equal to the initial maximum Gamma voltage, and the target minimum Gamma voltage is equal to the initial minimum Gamma voltage.

Correspondingly, an embodiment of this application further provides a voltage compensation method. As shown in FIG. 6, the voltage compensation method may include the following steps.

Step S101: Acquire a first power supply voltage on a power line ELVDD at an end of the OLED display screen 01 in a black frame insertion phase after the OLED display screen 01 is turned on, and obtain a reference voltage based on the first power supply voltage.

For example, the first power supply voltage on the power line ELVDD at the end of the OLED display screen 01 is acquired at least once in the black frame insertion phase after the OLED display screen 01 is turned on, the first power supply voltage acquired each time is converted into a first digital signal, the reference voltage is obtained based on at least one first digital signal, and the reference voltage is stored.

Optionally, the reference voltage may be calculated based on an average value of a plurality of first digital signals.

Step S102: Acquire a second power supply voltage on the power line ELVDD when each frame of picture is displayed, and adjust a pre-stored initial maximum Gamma voltage and a pre-stored initial minimum Gamma voltage based on a difference between the reference voltage and the currently obtained second power supply voltage, to obtain a target maximum Gamma voltage and a target minimum Gamma voltage.

For example, the second power supply voltage on the power line ELVDD is acquired at least once when each frame of picture is displayed, the second power supply voltage acquired each time is converted into a second digital signal, and the pre-stored initial maximum Gamma voltage and the pre-stored initial minimum Gamma voltage are adjusted based on a difference between the currently obtained second digital signal and the stored reference voltage, to obtain the target maximum Gamma voltage and the target minimum Gamma voltage.

In a possible implementation, whether the difference between the currently obtained second digital signal and the stored reference voltage is greater than a threshold may be first determined; and the initial maximum Gamma voltage and the initial minimum Gamma voltage are adjusted separately based on the difference if the difference between the currently obtained second digital signal and the stored reference voltage is greater than the threshold, to obtain the target maximum Gamma voltage and the target minimum Gamma voltage.

Further, if the difference between the currently obtained second digital signal and the stored reference voltage is less than or equal to the threshold, the target maximum Gamma voltage is equal to the initial maximum Gamma voltage, and the target minimum Gamma voltage is equal to the initial minimum Gamma voltage.

Step S103: Provide the obtained target maximum Gamma voltage and the obtained target minimum Gamma voltage to the Gamma circuit 001, for the Gamma circuit 001 to perform Gamma curve adjustment based on the target maximum Gamma voltage and the target minimum Gamma voltage.

The following describes the voltage compensation circuit 003 and the voltage compensation method provided in embodiments of this application with reference to specific embodiments. It should be noted that the embodiments are intended to better explain this application, but are not intended to limit this application.

Figure 8:
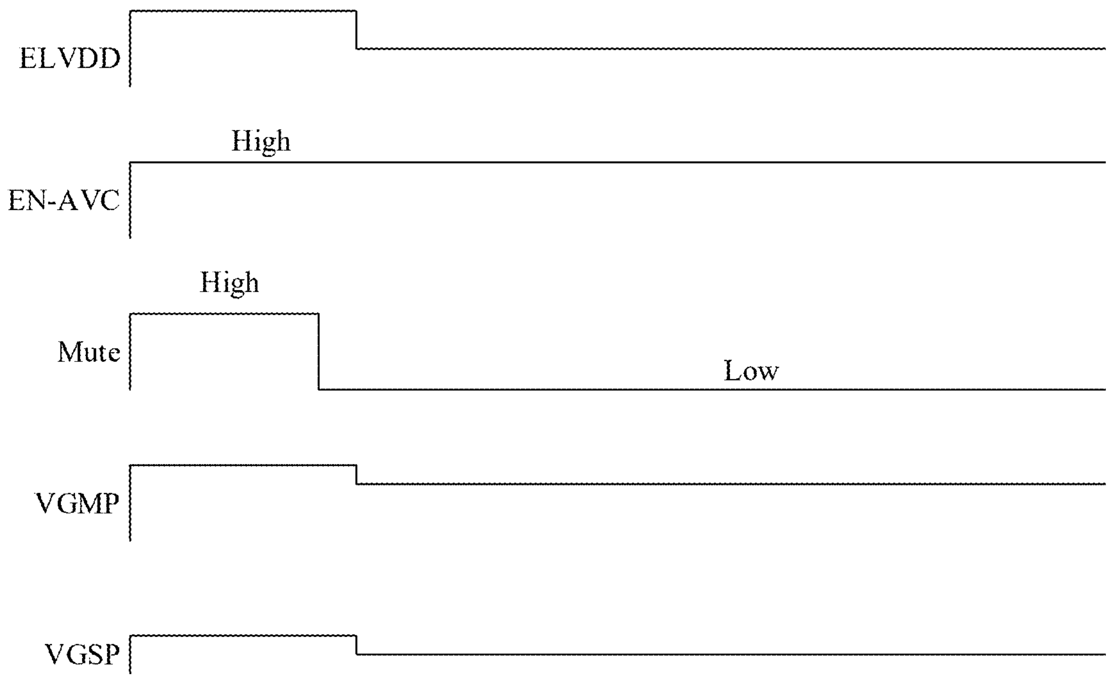
FIG. 8 is a sequence diagram corresponding to a display according to an embodiment of this application.
Figure 9:
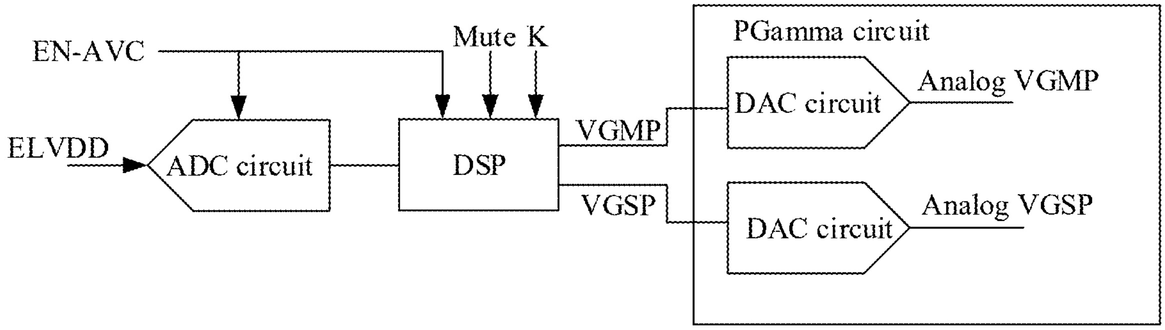
FIG. 9 is a diagram of a structure of a voltage compensation circuit according to another embodiment of this application.

FIG. 8 is a sequence diagram corresponding to a display according to an embodiment of this application. After the OLED display screen 01 is turned on, an EN-AVC signal is an enabling control signal for voltage compensation. High-level EN-AVC indicates that voltage compensation needs to be performed. Low-level EN-AVC indicates that voltage compensation does not need to be performed. A high-level Mute signal indicates a black frame insertion phase. A low-level Mute signal indicates a normal picture display phase. With reference to FIG. 8, FIG. 9 is a diagram of a structure of a voltage compensation circuit 003 according to an embodiment of this application. Implementation of this application is divided into two phases: ELVDD sampling with no IR Drop and a normal compensation phase. An ADC circuit acquires a voltage on the power line ELVDD at the end of the OLED display screen 01, converts the acquired voltage into a digital signal, and sends the digital signal to a DSP for processing.

Figure 10:
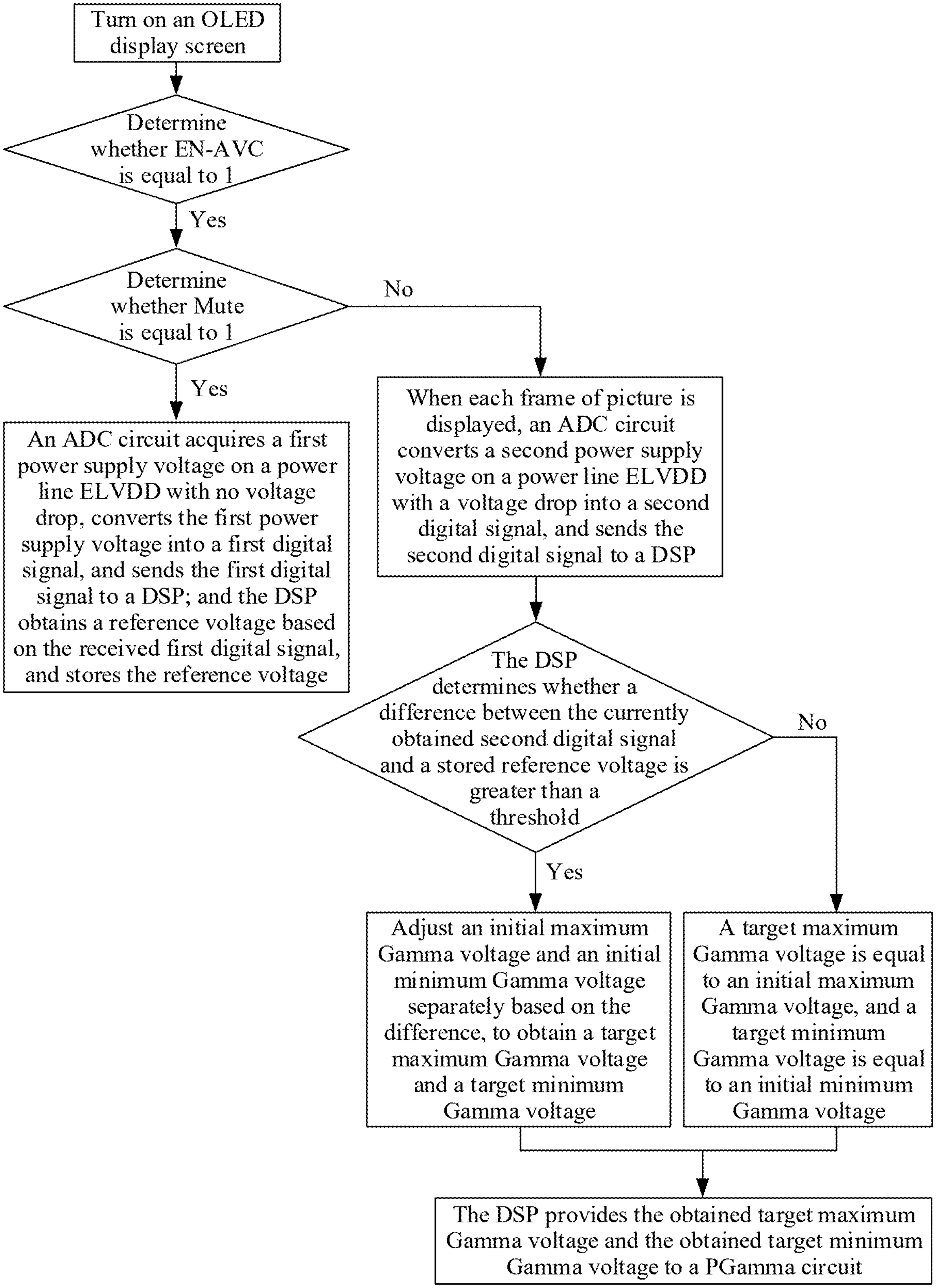
FIG. 10 is a schematic flowchart of the voltage compensation circuit shown in FIG. 9 performing voltage compensation.

FIG. 10 is a schematic flowchart of the voltage compensation circuit 003 shown in FIG. 9 performing voltage compensation. With reference to the sequence diagram shown in FIG. 8, after the OLED display screen 01 is turned on, whether EN-AVC is equal to 1 is determined. If EN-AVC is equal to 1, whether Mute is equal to 1 is determined. If Mute is equal to 1, the OLED display screen 01 enters a black frame insertion phase, the OLED display screen 01 displays a black frame insertion picture, and it may be considered that almost no current is supplied to the OLED. In the black frame insertion phase, the ADC circuit acquires a first power supply voltage on the power line ELVDD with no IR Drop, converts the first power supply voltage into a first digital signal, and sends the first digital signal to the DSP. The DSP obtains a reference voltage based on the received first digital signal, and stores the reference voltage. After the black frame insertion picture ends, Mute is equal to 0. When each frame of picture is displayed, the ADC circuit converts a second power supply voltage on the power line ELVDD with an IR Drop into a second digital signal, and sends the second digital signal to the DSP. The DSP determines whether the difference between the currently obtained second digital signal and the stored reference voltage is greater than a threshold; and adjusts the initial maximum Gamma voltage and the initial minimum Gamma voltage separately based on the difference if the difference between the currently obtained second digital signal and the stored reference voltage is greater than the threshold, to obtain the target maximum Gamma voltage and the target minimum Gamma voltage. If the difference between the currently obtained second digital signal and the stored reference voltage is less than or equal to the threshold, the target maximum Gamma voltage is equal to the initial maximum Gamma voltage, and the target minimum Gamma voltage is equal to the initial minimum Gamma voltage. Finally, the DSP provides the obtained target maximum Gamma voltage and the obtained target minimum Gamma voltage to a PGamma circuit 001. Two DAC circuits inside the PGamma circuit 001 may convert the target maximum Gamma voltage and the target minimum Gamma voltage respectively into two analog signals, so that the PGamma circuit 001 may perform Gamma curve adjustment based on the two analog signals, to generate a gray-scale voltage corresponding to image data.

According to the voltage compensation circuit 003 provided in embodiments of this application, an IR Drop on a power line ELVDD can be indirectly compensated by compensating a minimum Gamma voltage and a maximum Gamma voltage. In addition, for implementation of embodiments of this application, only an ADC and a DSP need to be introduced based on an original source driver circuit 021. This has low costs, has no need to occupy an area of a display screen, and can implement fast and high-precision ELVDD compensation by using a high-precision ADC.

Figure 11:
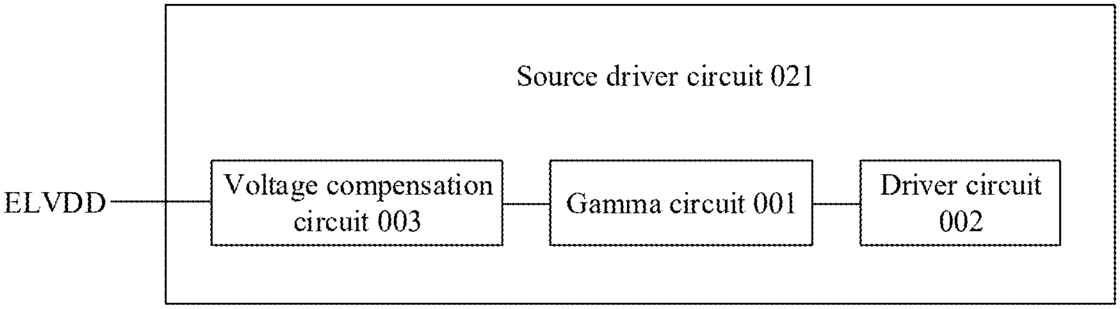
FIG. 11 is a diagram of a structure of a source driver circuit according to an embodiment of this application.

Correspondingly, as shown in FIG. 11, this application further provides a source driver circuit 021, including any one of the foregoing voltage compensation circuits 003 provided in embodiments of this application, and a Gamma circuit 001 connected to the voltage compensation circuit 003. When each frame of picture is displayed, a pre-stored initial maximum Gamma voltage and a pre-stored initial minimum Gamma voltage may be adjusted based on a difference between a second power supply voltage on a power line ELVDD and a reference voltage, to obtain a target maximum Gamma voltage and a target minimum Gamma voltage, and then the obtained target maximum Gamma voltage and the obtained target minimum Gamma voltage are provided to the Gamma circuit 001. The Gamma circuit 001 may perform Gamma curve adjustment based on the target maximum Gamma voltage and the target minimum Gamma voltage, to adjust Vdata in real time, to further compensate an IR Drop on a power line ELVDD by adjusting Vdata, improving screen display brightness.

Still as shown in FIG. 11, the source driver circuit 021 further includes a driver circuit 002. The Gamma circuit 001 performs Gamma curve adjustment based on the target maximum Gamma voltage and the target minimum Gamma voltage, which can generate a gray-scale voltage corresponding to image data. Then, the driver circuit 002 may provide the gray-scale voltage to a data line of the OLED display screen 01, thereby implementing picture display.

Correspondingly, this application further provides a display, including an OLED display screen 01 and the source driver circuit 021 provided in embodiments of this application. The source driver circuit 021 is configured to drive the OLED display screen 01. For a structure of the display, refer to FIG. 5. The display may be any product or component with a display function, such as a mobile phone, a tablet computer, a television, a notebook computer, a digital photo frame, or a navigator. For implementation of the display, refer to the foregoing embodiment of the source driver circuit 021. Details are not described again.

It is clear that a person skilled in the art can make various modifications and variations to this application without departing from the protection scope of this application. In this way, this application is intended to cover these modifications and variations of this application provided that they fall within the scope of the claims of this application and their equivalent technologies.

What is claimed is:

1. A display, comprising:

a voltage compensation circuit;

an organic light-emitting diode (OLED) display screen; and a Gamma circuit;

wherein the voltage compensation circuit is configured to:

acquire a first power supply voltage on a power line at an end of the OLED display screen in a black frame insertion phase after the OLED display screen is turned on, and obtain a reference voltage based on the first power supply voltage;

acquire a second power supply voltage on the power line when each frame of picture is displayed, and adjust a pre-stored initial maximum Gamma voltage and a pre-stored initial minimum Gamma voltage based on a difference between the reference voltage and a currently obtained second power supply voltage, to obtain a target maximum Gamma voltage and a target minimum Gamma voltage; and provide the obtained target maximum Gamma voltage and the obtained target minimum Gamma voltage to the Gamma circuit, for the Gamma circuit to perform Gamma curve adjustment based on the target maximum Gamma voltage and the target minimum Gamma voltage.

2. The display according to claim 1, wherein the voltage compensation circuit comprises a sampling circuit and a processing circuit;

wherein the sampling circuit is configured to:

acquire the first power supply voltage on the power line at the end of the OLED display screen at least once in the black frame insertion phase after the OLED display screen is turned on, convert the first power supply voltage acquired each time into a first digital signal, and send the first digital signal to the processing circuit; and acquire the second power supply voltage on the power line at least once when each frame of picture is displayed, convert the second power supply voltage acquired each time into a second digital signal, and send the second digital signal to the processing circuit; and wherein the processing circuit is configured to:

receive, in the black frame insertion phase, each first digital signal sent by the sampling circuit, obtain the reference voltage based on at least one received first digital signal, and store the reference voltage;

receive, when each frame of picture is displayed, each second digital signal sent by the sampling circuit, and adjust the pre-stored initial maximum Gamma voltage and the pre-stored initial minimum Gamma voltage based on a difference between a currently obtained second digital signal and the stored reference voltage, to obtain the target maximum Gamma voltage and the target minimum Gamma voltage; and provide the obtained target maximum Gamma voltage and the obtained target minimum Gamma voltage to the Gamma circuit in the OLED display screen, for the Gamma circuit to perform Gamma curve adjustment based on a currently obtained target maximum Gamma voltage and a currently obtained target minimum Gamma voltage.

3. The display according to claim 2, wherein obtaining the reference voltage based on the at least one first digital signal comprises:

obtaining the reference voltage based on an average value of a plurality of received first digital signals.

4. The display according to claim 2, wherein adjusting the pre-stored initial maximum Gamma voltage and the pre-stored initial minimum Gamma voltage based on the difference between the currently obtained second digital signal and the stored reference voltage, to obtain the target maximum Gamma voltage and the target minimum Gamma voltage, comprises:

determining whether the difference between the currently obtained second digital signal and the stored reference voltage is greater than a threshold; and based on the difference between the currently obtained second digital signal and the stored reference voltage being greater than the threshold, adjusting the pre-stored initial maximum Gamma voltage and the pre-stored initial minimum Gamma voltage separately based on the difference between the currently obtained second digital signal and the stored reference voltage, to obtain the target maximum Gamma voltage and the target minimum Gamma voltage.

5. The display according to claim 4, wherein the processing circuit is further configured to:

based on the difference between the currently obtained second digital signal and the stored reference voltage being less than or equal to the threshold, set the target maximum Gamma voltage to be equal to the pre-stored initial maximum Gamma voltage, and the target minimum Gamma voltage to be equal to the pre-stored initial minimum Gamma voltage.

6. A source driver circuit, comprising:

a voltage compensation circuit; and a Gamma circuit connected to the voltage compensation circuit;

wherein the voltage compensation circuit is configured to:

acquire a first power supply voltage on a power line at an end of an organic light-emitting diode (OLED) display screen in a black frame insertion phase after the OLED display screen is turned on, and obtain a reference voltage based on the first power supply voltage;

acquire a second power supply voltage on the power line when each frame of picture is displayed, and adjust a pre-stored initial maximum Gamma voltage and a pre-stored initial minimum Gamma voltage based on a difference between the reference voltage and a currently obtained second power supply voltage, to obtain a target maximum Gamma voltage and a target minimum Gamma voltage; and provide the obtained target maximum Gamma voltage and the obtained target minimum Gamma voltage to the Gamma circuit, for the Gamma circuit to perform Gamma curve adjustment based on the target maximum Gamma voltage and the target minimum Gamma voltage.

7. The source driver circuit according to claim 6, wherein the voltage compensation circuit comprises a sampling circuit and a processing circuit;

wherein the sampling circuit is configured to:

acquire the first power supply voltage on the power line at the end of the OLED display screen at least once in the black frame insertion phase after the OLED display screen is turned on, convert the first power supply voltage acquired each time into a first digital signal, and send the first digital signal to the processing circuit; and acquire the second power supply voltage on the power line at least once when each frame of picture is displayed, convert the second power supply voltage acquired each time into a second digital signal, and send the second digital signal to the processing circuit; and wherein the processing circuit is configured to:

receive, in the black frame insertion phase, each first digital signal sent by the sampling circuit, obtain the reference voltage based on at least one received first digital signal, and store the reference voltage;

receive, when each frame of picture is displayed, each second digital signal sent by the sampling circuit, and adjust the pre-stored initial maximum Gamma voltage and the pre-stored initial minimum Gamma voltage based on a difference between a currently obtained second digital signal and the stored reference voltage, to obtain the target maximum Gamma voltage and the target minimum Gamma voltage; and provide the obtained target maximum Gamma voltage and the obtained target minimum Gamma voltage to the Gamma circuit in the OLED display screen, for the Gamma circuit to perform Gamma curve adjustment based on the obtained target maximum Gamma voltage and the obtained target minimum Gamma voltage.

8. The source driver circuit according to claim 7, wherein obtaining the reference voltage based on the at least one first digital signal comprises:

obtaining the reference voltage based on an average value of a plurality of received first digital signals.

9. The source driver circuit according to claim 7, wherein adjusting the pre-stored initial maximum Gamma voltage and the pre-stored initial minimum Gamma voltage based on the difference between the currently obtained second digital signal and the stored reference voltage, to obtain the target maximum Gamma voltage and the target minimum Gamma voltage, comprises:

determining whether the difference between the currently obtained second digital signal and the stored reference voltage is greater than a threshold; and based on the difference between the currently obtained second digital signal and the stored reference voltage being greater than the threshold, adjusting the pre-stored initial maximum Gamma voltage and the pre-stored initial minimum Gamma voltage separately based on the difference between the currently obtained second digital signal and the stored reference voltage, to obtain the target maximum Gamma voltage and the target minimum Gamma voltage.

10. The source driver circuit according to claim 9, wherein the processing circuit is further configured to:

based on the difference between the currently obtained second digital signal and the stored reference voltage being less than or equal to the threshold, set the target maximum Gamma voltage to be equal to the pre-stored initial maximum Gamma voltage, and the target minimum Gamma voltage to be equal to the pre-stored initial minimum Gamma voltage.

11. A voltage compensation method, comprising:

acquiring, by a voltage compensation circuit, a first power supply voltage on a power line at an end of an organic light-emitting diode (OLED) display screen in a black frame insertion phase after the OLED display screen is turned on, and obtaining a reference voltage based on the first power supply voltage;

acquiring, by the voltage compensation circuit, a second power supply voltage on the power line when each frame of picture is displayed, and adjusting a pre-stored initial maximum Gamma voltage and a pre-stored initial minimum Gamma voltage based on a difference between the reference voltage and a currently obtained second power supply voltage, to obtain a target maximum Gamma voltage and a target minimum Gamma voltage; and providing, by the voltage compensation circuit, the obtained target maximum Gamma voltage and the obtained target minimum Gamma voltage to a Gamma circuit, for the Gamma circuit to perform Gamma curve adjustment based on the target maximum Gamma voltage and the target minimum Gamma voltage.

12. The voltage compensation method according to claim 11, wherein acquiring the first power supply voltage on the power line at the end of the OLED display screen in the black frame insertion phase after the OLED display screen is turned on and obtaining the reference voltage based on the first power supply voltage comprises:

acquiring the first power supply voltage on the power line at the end of the OLED display screen at least once in the black frame insertion phase after the OLED display screen is turned on, converting the first power supply voltage acquired each time into a first digital signal, obtaining the reference voltage based on at least one first digital signal, and storing the reference voltage; and wherein acquiring the second power supply voltage on the power line when each frame of picture is displayed and adjusting the pre-stored initial maximum Gamma voltage and the pre-stored initial minimum Gamma voltage based on the difference between the reference voltage and the currently obtained second power supply voltage to obtain the target maximum Gamma voltage and the target minimum Gamma voltage comprises:

acquiring the second power supply voltage on the power line at least once when each frame of picture is displayed, converting the second power supply voltage acquired each time into a second digital signal, and adjusting the pre-stored initial maximum Gamma voltage and the pre-stored initial minimum Gamma voltage based on a difference between a currently obtained second digital signal and the stored reference voltage, to obtain the target maximum Gamma voltage and the target minimum Gamma voltage.

13. The voltage compensation method according to claim 12, wherein obtaining the reference voltage based on the at least one first digital signal comprises:

obtaining the reference voltage based on an average value of a plurality of first digital signals.

14. The voltage compensation method according to claim 12, wherein adjusting the pre-stored initial maximum Gamma voltage and the pre-stored initial minimum Gamma voltage based on the difference between the currently obtained second digital signal and the stored reference voltage to obtain the target maximum Gamma voltage and the target minimum Gamma voltage comprises:

determining whether the difference between the currently obtained second digital signal and the stored reference voltage is greater than a threshold; and based on the difference between the currently obtained second digital signal and the stored reference voltage being greater than the threshold, adjusting the pre-stored initial maximum Gamma voltage and the pre-stored initial minimum Gamma voltage separately based on the difference between the currently obtained second digital signal and the stored reference voltage, to obtain the target maximum Gamma voltage and the target minimum Gamma voltage.

15. The voltage compensation method according to claim 14, further comprising:

based on a respective difference between a respective currently obtained second digital signal and the stored reference voltage being less than or equal to the threshold, setting a respective target maximum Gamma voltage to be equal to the pre-stored initial maximum Gamma voltage, and a respective target minimum Gamma voltage to be equal to the pre-stored initial minimum Gamma voltage.

* * * * *